United States Patent Office 3,716,599
Patented Feb. 13, 1973

3,716,599
ACRYLIC FLUOROCARBON COATING COMPOSITIONS
Joseph A. Vasta, Woodbury, N.J., assignor to E. I. du Pont de Nemours and Company, Wilmington, Del.
No Drawing. Continuation-in-part of application Ser. No. 77,310, Oct. 1, 1970. This application Oct. 20, 1971, Ser. No. 191,056
Int. Cl. C08g 41/04
U.S. Cl. 260—859
11 Claims

ABSTRACT OF THE DISCLOSURE

Converting coating compositions containing polyvinyl fluoride or polyvinylidene fluoride and a cross-linkable amino acrylic polymer and a blocked isocyanate.

RELATED APPLICATION

This application is a continuation-in-part of U.S. Ser. No. 77,310 filed Oct. 1, 1970 now abandoned.

The invention relates to coating compositions which are thermosetting and contain a non-crosslinkable fluoropolymer and an acrylic polymer having pendant amine and hydroxyl moieties. Blocked isocyanates converted in situ to polyurethanes provide crosslinking with the acrylic polymer thereby enhancing physical properties of the system such as durability, flexibility and adhesion.

This invention is a coating composition comprised of (a) 15 to 75% by weight of a fluoropolymer selected from the group consisting of polyvinyl fluoride and polyvinylidene fluoride and copolymers of each containing at least 50% by weight thereof; the remainder comprising (b) and (c) wherein (c) is present in an amount sufficient to react with at least half of the hydroxyl acrylic moieties in (b) and wherein (b) Is a random acrylic polymer containing: 1 to 20% by weight of units derived from amino acrylic monomers selected from the group consisting of diethylaminoethyl-methacrylate, amino hydroxypropylmethacrylate and diethanol amine methacrylate, 3 to 30% by weight of units derived from hydroxyl acrylic monomers selected from the group consisting of hydroxy propyl methacrylate, hydroxy butyl acrylate, hydroxy butyl methacrylate, and diglyceride esters of acrylic and methacrylic acid, and 50 to 96% by weight of non-reactive acrylic units derived from at least one member of the group consisting of styrene, substituted styrene, acrylate esters, methacrylate esters, maleate esters, fumarate esters and itaconate esters, and (c) Is a blocked polyisocyanate having the general structure

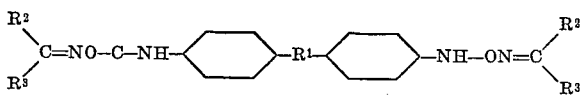

where

R¹ is an alkylene group of 1 to 6 carbon atoms, and
R² and R³ are each an alkyl group of 1 to 4 carbon atoms, all percents by weight of fluoropolymer, acrylic polymer and blocked isocyanate based on the combined weight of fluoropolymer, acrylic polymer, and blocked isocyanate.

In one embodiment the coating composition comprises (a) 25 to 75% by weight of a fluoropolymer selected from the group consisting of polyvinyl fluoride and polyvinylidene fluoride and copolymers of each containing at least 50% by weight thereof; the remainder comprising (b) and (c) wherein (b) and (c) are present in an amount of not more than 3 parts by weight of (b) per part by weight of (c) and not less than 5 parts by weight of (b) per 8 parts by weight of (c); and wherein (b) is a random acrylic polymer containing: 1 to 20% by weight of units derived from amino acrylic monomers selected from the group consisting of diethylamino-ethyl-methylacrylate, and diethanol amine methacrylate, 3 to 30% by weight of units derived from hydroxyl acrylic monomers selected from the group consisting of hydroxyl propyl methacrylate, hydroxyl butyl acrylate, hydroxyl butyl methacrylate, and diglyceride esters of acrylic and methacrylic acid, and 50 to 96% by weight of non-reactive acrylic units derived from at least one member of the group consisting of styrene, substituted styrene, acrylate esters, methacrylate esters, maleate esters, fumarate esters and itaconate esters and (c) Is a blocked polyisocyanate having the general structure

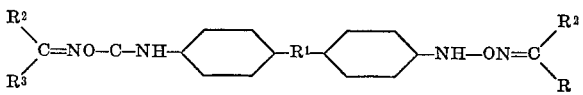

where

R¹ is an alkylene group of 1 to 6 carbon atoms, and
R² and R³ are each an alkyl group of 1 to 4 carbon atoms, all percents by weight of fluoropolymer, acrylic polymer and blocked isocyanate based on the combined weight of fluoropolymer, acrylic polymer and blocked isocyanate.

In one coating composition
(a) The fluoropolymer comprises at least 50% by weight,
(b) The acrylic polymer forms at least 35% by weight and contains at least 5% by weight of units derived from said amino acrylic monomer, at least 10% by weight of units derived from said hydroxy acrylic monomers, and from 60 to 75% by weight of units derived from said unreactive acrylic monomers, all percents by weight of fluoropolymer, acrylic polymer and blocked isocyanate based on the combined weight of fluoropolymer, acrylic polymer and blocked isocyanate. Preferably, the blocked isocyanate is a methyl ethyl ketoxime and a trifunctional biuret of hexamethylene diisocyanate. The acrylic polymer desirably has a molecular weight of between about 5,000 and 40,000 and most preferably about 10,000.

The fluoropolymer can be present as a solution in a volatile organic solvent or as a dispersion of very fine particles of the polymer in either a volatile organic or latent solvent (organosol composition). "Latent solvent" designates a solvent having no significant solvent or swelling action on the fluoropolymer at room temperature but having sufficient solvent and wetting action to cause particles of said polymer to coalesce at an elevated temperature below the normal boiling point of the solvent. The most advantageous results are obtained with the solution and organosol compositions.

The molecular weight of the fluoropolymer can be selected to fit the intended application in accordance with the well known principles related to solubility, viscosity, toughness, hardness and the like.

Among the useful hydrofluorocarbon polymers are polyvinyl fluoride (e.g. as described in U.S. Pats. 2,419,010 and 2,510,783), polyvinylidene fluoride (e.g. as described in U.S. Pat. 2,435,537), vinyl fluoride copolymers (e.g. as described in U.S. Pat. 2,935,818, column 3), and vinylidene fluoride copolymers (e.g. as described in U.S. Pats. 2,468,054 and 2,970,988). To illustrate, the copolymer can be a vinyl fluoride:vinylidene fluoride copolymer or a copolymer of either vinyl fluoride or vinylidene fluoride with at least one other halogen-substituted ethylenically unsaturated hydrocarbon comonomer. Especially useful copolymers in this class are terpolymers in which the third comonomer is an alkyl acrylate or alkyl methacrylate. The preferred copolymers have a vinyl fluoride or vinylidene fluoride content of at least 50 weight percent.

As is known in the art, it is often necessary to use a hot solvent in order to form a solution of a hydrofluorocarbon polymer. Solvents selected from those hereinafter tested should be suitable: dimethylformamide, tetramethylene sulfone, nitroparaffins, cyclohexanone, dibutyl ketone, mesityl oxide, aniline, phenol, methyl benzoate, phenyl acetate and diethyl phosphate. The following illustrate useful latent solvents in which various particulate hydrofluorocarbon polymers can be dispersed and subsequently coalesced by heating; butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N-dimethylformamide, N,N-dimethyl-gammahydroxyacetamide, N,N-dimethyl - gamma-hydroxybutyramide, N,N-dimethylacetamide, N,N-dimethylmethoxy acetamide, N-methylacetamide, N-methylformamide, N,N-dimethylaniline, N,N-dimethylethanolamine, 2-piperidone, N-methyl-2-piperidone, N-methyl-2-pyrrolidine, N-ethyl-2-pyrrolidone, N-isopropyl-2 - pyrrolidone, 5-methyl-2 - pyrrolidone, beta - propiolactone, delta-valerolactone, gamma-valerolactone, alpha-angelicalactone, beta-angelicalactone, epsilon-caprolactone, and alpha,beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropene, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis(methoxymethyl)uron, methylacetylsalicylate, diethyl phosphate, dimethyl phthalate, ethyl acetoacetate, methyl benzoate, methylene diacetate, methyl salicylate, phenyl acetate triethyl phosphate, tris(morpholino)phosphine oxide, N-acetylmorpholine, N-acetylpiperidine, isoquinoline, quinoline, pyridine and tris(dimethylamido)phosphate.

The nature of the acrylic monomers used to produce a random copolymer can be chosen to produce a combination of properties desired by the formulator.

The acrylic polymer is a random polymer formed from various monomers selected in light of the ultimate properties desired in the coating. The acrylic polymer must contain from 1 to 20% by weight, preferably 5 to 10%, of amino acrylic monomers. Illustrative of such monomers are diethylaminoethylmethacrylate, tertiary butyl ethylamino methacrylate, and diethanol amine methacrylate.

The acrylic polymer also contains from 3 to 30% by weight, preferably at least 10%, and not more than 20%, of hydroxy acrylic monomers. Illustrative of such monomers are hydroxyl propyl methacrylate, hydroxy butyl acrylate, hydroxy butyl methacrylate, diglyceride esters of acrylic and methacrylic acid.

The remaining portion of the acrylic polymer can be composed of non-reactive monomers such as styrene, substituted styrenes, acrylate esters, methacrylate esters, maleate esters, fumarate esters, itaconate esters. These non-reactive monomers should form from 50 to 96% by weight of the acrylic polymer, preferably 60 to 75%.

The total acrylic polymer is a random polymer and preferably has a molecular weight of about 5,000 to 40,000, most preferably about 10,000, and a relative viscosity of about 1.02 to 1.3 as measured in solution at 0.05 grams/100 grams of diethylene chloride at 25° C. The composition can include from 25 to 60% by weight and preferably at least 35% by weight of the acrylic polymer when the fluorocarbon polymer comprises between 50–60% by weight both percentages based on the combined weight of acrylic polymer, fluoropolymer and blocked isocyanate.

The coating composition also contains a blocked isocyanate or urethane crosslinking agent. Typical blocking agents that can be used to form blocked polyisocyanate crosslinking agents for use in the coating compositions of this invention are, for example, phenol compounds, alcohols, such as tertiary butyl alcohols, ketoximes, glycol esters, and the like. Typical phenol compounds that can be used are phenol, propyl phenols, tertiary butyl phenol, nonyl phenol, other monohydric phenols, bromo phenol, 2-chloro phenol, dichloro phenol, lithoxy phenol, 2-methoxy nitrophenol and the like. Preferably, ketoximes are used as blocking agents for the polyisocyanates used in this invention. Since preferred ketoximes are, for example, acetoxime, methyl ethyl ketoxime, diisobutyl ketoximes and the like.

Blocked polyisocyanates useful in this invention include

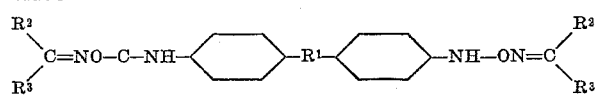

where $R^1$ is an alkylene group of 1 to 6 carbon atoms, and $R^2$ and $R^3$ are each an alkyl group of 1 to 4 carbon atoms.

A preferred blocked isocyanate is a methyl ethyl ketoxime and a trifunctional biuret of hexamethylene diisocyanate.

Preferably, about 0.01 to 1.0% by weight, based on the weight of the film forming constituents of this invention of a catalyst is added to the coating composition to accelerate cross-linking of the acrylic polymer and polyisocyanate once the coating composition has been applied. Useful catalysts include the organo tin catalysts such as butyl tin dilaurate, dibutyl tin di-ethylhexoate, stannous octoate, stannous oleate and the like, zinc naphthenate, vanadium acetyl acetonate, zirconium acetyl acetonate, and the like; tertiary amines such as triethylene diamine, triethyl amine and substituted morpholines.

Solvents which can be used to prepare the coating composition of this invention are high boiling aromatic naphthas, N-methyl pyrrolidone, propylene carbonate, butyllactone, and isophorone.

Preparation

The coating compositions of this invention are prepared by conventionally preparing the acrylic polymer, blocked isocyanate, and fluoropolymer and blending them in the proper proportions. These compositions can be applied to a substrate by conventional coating techniques such as wiping, brushing, spraying, roll coating, reverse roll coating, dipping, and of course will typically contain pigments and dispersants and the like. They are suitable as appliance coatings and the like and have good luster in addition to satisfactory physical properties for many end uses.

The coating compositions of this invention can be thermoset at temperatures of between 400 to 550° F. for 60 seconds and most preferably at least 90 seconds to 30 minutes depending on the temperature.

In the examples which follow all parts are by weight unless otherwise indicated.

EXAMPLE 1

(1) A 30/45/20/5 by weight polymer of methyl methacrylate/ethyl acrylate/hydroxyethylacrylate/t-butyl amino ethyl methacrylate was prepared by (a) Adding over a period of 2 hours a mixture of 540 grams of methyl methacrylate monomer, 810 grams of ethyl acrylate monomer, 90 grams of t-butylamino ethyl methacrylate, 360 grams of 2-hydroxyethyl acrylate and 18 grams of azobisisobutyronitrile initiator to 951 grams of toluene at reflux temperature.

(b) The mixture of (a) was held at reflux for an additional 5 hours followed by the addition of 231 grams of ethylene glycol monoethyl ether acetate to yield a polymeric solution at 60% solids.

(2) A blocked aliphatic isocyanate was prepared by reacting 508 grams of hexamethylene diisocyanate, 0.1125 gram of dibutyl tin dilaurate and 192 grams of methyl ethyl ketoxime in 100 grams of a Cellosolve acetate/xylol blend (1:1 ratio by weight).

(3) A white coating composition was prepared by mixing 121.5 grams of $TiO_2$, 121.5 grams of polyvinylidene fluoride ($PVF_2$), 110.5 grams of the acrylic polymer prepared in step (1), 42.5 grams of the blocked isocyanate prepared in step (2), 2.5 grams of microcrystalline wax, 130.0 grams of butyrolactone, 86.0 grams of isophorone, and 0.9 gram of Thermolite 31 [1]. This mixture was pebble mill ground for 24 hours to yield the final composition. This composition was applied via a wire round rod to a treated aluminum substrate and thermoset at 500° F. for 2 minutes to yield a film having excellent chemical resistance, hardness, flexibility, appearance and moderate gloss.

EXAMPLE 2

A coating composition having 36/45/19 ratio by weight of polyvinylidene fluoride/acrylic polymer (as in Example 1)/blocked isocyanate (as in Example 1) was prepared in accordance with the procedure of Example 1. This composition had a final composition of

| | Grams |
|---|---|
| $TiO_2$ | 193.5 |
| $Sb_2O_3$ | 1.95 |
| $PVF_2$ | 162.50 |
| Acrylic polymer | 203.13 |
| Blocked isocyanate | 86.12 |
| Thermolite 31 | 1.63 |
| Microcrystalline wax | 3.25 |
| Butyrolactone | 209.0 |
| Isophorone | 139.37 |

This coating composition was also ground for 24 hours. Upon application and thermosetting, it produced a finish having good properties comparable to the finish of Example 1.

EXAMPLE 3

A coating composition having 15.8/59.4/24.8 ratio by weight of polyvinylidene fluoride/acrylic polymer (as in Example 1)/blocked isocyanate (as in Example 1) was prepared in accordance with the procedure of Example 1. This composition had a final composition of

| | Grams |
|---|---|
| $TiO_2$ | 193.05 |
| $Sb_2O_3$ | 1.95 |
| $PVF_2$ | 81.25 |
| Acrylic polymer | 304.69 |
| Blocked isocyanate | 128.05 |
| Thermolite 31 | 0.65 |
| Microcrystalline wax | 3.25 |
| Butyrolactone | 172.25 |
| Isophorone | 114.86 |

This coating composition was also ground for 24 hours. Upon application and thermosetting it produced a finish having good properties comparable to the finishes of Examples 1 and 2.

EXAMPLE 4

A coating composition having 36/45/19 ratio by weight of polyvinylidene fluoride/acrylic polymer (as in Example 1)/blocked isocyanate (as in Example 1) can be prepared in accordance with the procedure of Example 1 having a final composition of

| | Grams |
|---|---|
| $TiO_2$ | 149.18 |
| $Sb_2O_3$ | 45.83 |
| $PVF_2$ | 162.50 |
| Acrylic polymer | 203.13 |
| Blocked isocyanate | 85.35 |
| Microcrystalline wax | 3.25 |
| Thermolite 31 | 1.30 |
| Butyrolactone | 209.69 |
| Isophorone | 139.78 |

EXAMPLE 5

A coating composition having 15.8/59.6/24.6 ratio by weight of polyvinylidene fluoride/acrylic polymer (as in Example 1)/blocked isocyanate (as in Example 1) can be prepared in accordance with the procedure of Example 1 having a final composition of

| | Grams |
|---|---|
| $TiO_2$ | 149.18 |
| $Sb_2O_3$ | 45.83 |
| $PVF_2$ | 81.25 |
| Acrylic polymer | 304.69 |
| Blocked isocyanate | 128.05 |
| Microcrystalline wax | 3.25 |
| Thermolite 31 | 0.65 |
| Butyrolactone | 172.25 |
| Isophorone | 114.86 |

EXAMPLE 6

A coating composition having 36/45/19 ratio by weight of polyvinyl fluoride/acrylic polymer (as in Example 1)/blocked isocyanate (as in Example 1) was prepared in accordance with the procedure of Example 1. This composition had a final composition of

| | Grams |
|---|---|
| $TiO_2$ | 193.05 |
| $Sb_2O_3$ | 1.95 |
| $PVF_2$ | 162.50 |
| Acrylic polymer | 203.13 |
| Blocked isocyanate | 86.13 |
| Thermolite 31 | 1.63 |
| Microcrystalline wax | 3.25 |
| Butyrolactone | 209.01 |
| Isophorone | 139.36 |

This coating composition was also ground for 24 hours. Upon application and thermosetting it produced a finish having good properties.

EXAMPLE 7

A coating composition having 15.6/59.4/25 ratio by weight of polyvinyl fluoride/acrylic polymer (as in Example 1)/blocked isocyanate (as in Example 1) was prepare in accordance with the procedure of Example 1. This composition had a final composition of

| | Grams |
|---|---|
| $TiO_2$ | 193.05 |
| $Sb_2O_3$ | 1.95 |
| $PVF_2$ | 81.25 |
| Acrylic polymer | 304.69 |
| Blocked isocyanate | 128.05 |
| Thermolite 31 | 0.65 |
| Microcrystalline wax | 3.25 |
| Butyrolactone | 172.25 |
| Isophorone | 114.86 |

This coating composition was also ground for 24 hours. Upon application and thermosetting it produced a finish having good properties.

EXAMPLE 8

A coating composition having 36.1/45/18.9 ratio by weight of polyvinyl fluoride acrylic polymer (as in Example 1)/blocked isocyanate (as in Example 1) can be

---

[1] A tin sulfur heat stabilizing compound manufactured by M & T Chemicals, Inc.

prepared in accordance with the procedure of Example 1 having a final composition of

| | Grams |
|---|---|
| TiO$_2$ | 149.18 |
| Sb$_2$O$_3$ | 45.83 |
| PVF$_2$ | 162.50 |
| Acrylic polymer | 203.13 |
| Blocked isocyanate | 85.35 |
| Microcrystalline wax | 3.25 |
| Thermolite 31 | 1.30 |
| Butyrolactone | 209.69 |
| Isophorone | 139.78 |

EXAMPLE 9

A coating composition having 15.8/59.4/24.8 ratio by weight of polyvinyl fluoride/acrylic polymer (as in Example 1)/blocked isocyanate (as in Example 1) can be prepared in accordance with the procedure of Example 1 having a final composition of

| | Grams |
|---|---|
| TiO$_2$ | 149.18 |
| Sb$_2$O$_3$ | 45.83 |
| PVF$_2$ | 81.25 |
| Acrylic polymer | 304.69 |
| Blocked isocyanate | 128.05 |
| Microcrystalline wax | 3.25 |
| Thermolite 31 | .65 |
| Butyrolactone | 172.25 |
| Isophorone | 114.86 |

I claim:
1. A coating composition comprised of
(a) 15 to 75% by weight of a fluoropolymer selected from the group consisting of polyvinyl fluoride and polyvinylidene fluoride and copolymers of each containing at least 50% by weight thereof; the remainder comprising (b) and (c) wherein (c) is present in an amount sufficient to react with at least half of the hydroxyl acrylic moieties in (b) and wherein
(b) is a random acrylic polymer containing: 1 to 20% by weight of units derived from amino acrylic monomers selected from the group consisting of diethylaminoethylmethacrylate, amino hydroxypropylmethacrylate and diethanol amine methacrylate, 3 to 30% by weight of units derived from hydroxyl acrylic monomers selected from the group consisting of hydroxy propyl methacrylate, hydroxy butyl acrylate, hydroxy butyl methacrylate, diglyceride esters of acrylic and methacrylic acid, and 50 to 96% by weight of non-reactive acrylic units derived from at least one member of the group consisting of styrene, substituted styrene, acrylate esters, methacrylate esters, maleate esters, fumarate esters and itaconate esters, and
(c) is a blocked polyisocyanate having the general structure

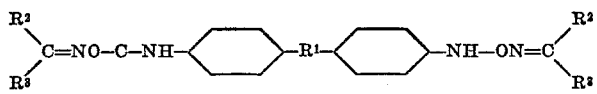

where
R$^1$ is an alkylene group of 1 to 6 carbon atoms, and
R$^2$ and R$^3$ are each an alkyl group of 1 to 4 carbon atoms, all percents by weight of fluoropolymer, acrylic polymer and blocked isocyanate based on the combined weight of fluoropolymer, acrylic polymer, and blocked isocyanate.

2. A coating composition comprised of
(a) 15 to 75% by weight of a fluoropolymer selected from the group consisting of polyvinyl fluoride and polyvinylidene fluoride and copolymers of each containing at least 50% by weight thereof; the remainder comprising (b) and (c) wherein (b) and (c) are present in an amount of not more than 3 parts by weight of (b) per part by weight of (c) and not less than 5 parts by weight of (b) per 8 parts by weight of (c); and wherein
(b) is a random acrylic polymer containing: 1 to 20% by weight of units derived from amino acrylic monomers selected from the group consisting of diethylaminoethylmethacrylate, amino hydroxypropylmethacrylate and diethanol amine methacrylate, 3 to 30% by weight of units derived from hydroxyl acrylic monomers selected from the group consisting of hydroxy propyl methacrylate, hydroxy butyl acrylate, hydroxy butyl methacrylate, and diglyceride esters of acrylic and methacrylic acid, and 50 to 96% by weight of non-reactive acrylic units derived from at least one member of the group consisting of styrene, substituted styrene, acrylate esters, methacrylate esters, maleate esters, fumarate esters and itaconate esters and
(c) is a blocked polyisocyanate having the general structure

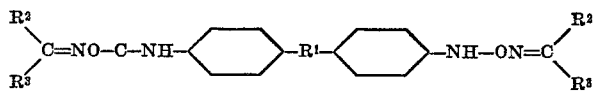

where
R$^1$ is an alkylene group of 1 to 6 carbon atoms, and
R$^2$ and R$^3$ are each an alkyl group of 1 to 4 carbon atoms, all percents by weight of fluoropolymer, acrylic polymer and blocked isocyanate based on the combined weight of fluoropolymer, acrylic polymer and blocked isocyanate.

3. The coating composition of claim 1 wherein
(a) the fluoropolymer comprises at least 50% by weight,
(b) the acrylic polymer forms at least 35% by weight and contains at least 5% by weight of units derived from said amino acrylic monomer, at least 10% by weight of units derived from said hydroxy acrylic monomers, and from 60 to 75% by weight of units derived from said unreactive acrylic monomers, all percents by weight of fluoropolymer, acrylic polymer and blocked isocyanate based on the combined weight of fluoropolymer, acrylic polymer and blocked isocyanate.

4. The coating composition of claim 1 wherein the blocked isocyanate is a methyl ethyl ketoxime and a trifunctional biuret of hexamethylene diisocyanate.

5. The coating composition of claim 2 wherein the blocked isocyanate is a methyl ethyl ketoxime and a trifunctional biuret of hexamethylene diisocyanate.

6. The coating composition of claim 1 wherein the acrylic polymer has a molecular weight of between about 5,000 and 40,000.

7. The coating composition of claim 6 wherein the acrylic polymer has a molecular weight of about 10,000.

8. The coating composition of claim 2 wherein the blocked polyisocyanate is a methyl ethyl ketoxime and a tri-functional biuret of hexamethylene diisocyanate.

9. The coating composition of claim 2 wherein the acrylic polymer has a molecular weight of between about 5,000 to 40,000.

10. The coating composition of claim 9 wherein the acrylic polymer has a molecular weight of about 10,000.

11. The coating composition of claim 2 wherein the fluoropolymer is present in an amount of at least 25% by weight based on the combined weight of fluoropolymer, acrylic polymer and blocked isocyanate.

References Cited

UNITED STATES PATENTS

| | | | |
|---|---|---|---|
| 3,245,941 | 4/1966 | Mayer | 260—31.6 |
| 3,284,415 | 11/1966 | Horvath | 260—77.5 |
| 3,293,203 | 12/1966 | Paulus | 260—859 |
| 3,322,433 | 5/1967 | Rentschler | 260—859 |
| 3,324,069 | 6/1967 | Koblitz | 260—31.4 |
| 3,340,222 | 9/1967 | Fang | 260—41 |
| 3,368,988 | 2/1968 | Sekmakas | 260—859 |
| 3,531,364 | 9/1970 | Schmidle | 260—859 |
| 3,532,652 | 10/1970 | Zang | 260—859 |

FOREIGN PATENTS

| | | |
|---|---|---|
| 841,197 | 7/1960 | Great Britain. |
| 1,138,474 | 1/1969 | Great Britain. |

PAUL LIEBERMAN, Primary Examiner

U.S. Cl. X.R.

260—28.5, 31.8 C, 32.8 N, 41 B, 45.7 S, 45.75 R, 45.75 K, 77.5 CR, 77.5 TB